United States Patent
Chang et al.

(10) Patent No.: US 10,437,482 B2
(45) Date of Patent: Oct. 8, 2019

(54) COORDINATED NEAR-FAR MEMORY CONTROLLER FOR PROCESS-IN-HBM

(71) Applicant: Samsung Electronics Co., Ltd., Suwon-si, Gyeonggi-do (KR)

(72) Inventors: Mu-Tien Chang, Santa Clara, CA (US); Dimin Niu, Sunnyvale, CA (US); Hongzhong Zheng, Los Gatos, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 29 days.

(21) Appl. No.: 15/723,014

(22) Filed: Oct. 2, 2017

(65) Prior Publication Data

US 2019/0034097 A1 Jan. 31, 2019

Related U.S. Application Data

(60) Provisional application No. 62/536,919, filed on Jul. 25, 2017.

(51) Int. Cl.
  *G06F 3/06* (2006.01)
  *G06F 12/02* (2006.01)

(52) U.S. Cl.
  CPC .......... *G06F 3/0617* (2013.01); *G06F 3/0653* (2013.01); *G06F 3/0659* (2013.01); *G06F 12/02* (2013.01)

(58) Field of Classification Search
  None
  See application file for complete search history.

(56) References Cited

U.S. PATENT DOCUMENTS

| | | | |
|---|---|---|---|
| 7,877,558 B2 | 1/2011 | Hughes et al. | |
| 8,266,393 B2 | 9/2012 | Moscibrod et al. | |
| 8,854,387 B2 | 10/2014 | Chung | |
| 9,317,429 B2 | 4/2016 | Ramanujan et al. | |
| 9,619,408 B2 | 4/2017 | Nale et al. | |
| 9,632,775 B2 | 4/2017 | Gonion | |
| 2015/0293709 A1* | 10/2015 | Quach ................ | G06F 13/1605 711/105 |
| 2015/0293864 A1 | 10/2015 | Hill et al. | |
| 2016/0070483 A1* | 3/2016 | Yoon ................... | G06F 13/1689 711/154 |
| 2017/0147429 A1 | 5/2017 | Motwani | |

* cited by examiner

*Primary Examiner* — Denise Tran
(74) *Attorney, Agent, or Firm* — Lewis Roca Rothgerber Christie LLP

(57) ABSTRACT

A method of coordinating memory commands in a high-bandwidth memory HBM+ system, the method including sending a host memory controller command from a host memory controller to a memory, receiving the host memory controller command at a coordinating memory controller, forwarding the host memory controller command from the coordinating memory controller to the memory, and scheduling, by the coordinating memory controller, a coordinating memory controller command based on the host memory controller command.

20 Claims, 3 Drawing Sheets

COORDINATED NEAR-FAR MEMORY CONTROLLER FOR PROCESS-IN-HBM

CROSS-REFERENCE TO RELATED APPLICATION(S)

The present application claims priority to, and the benefit of, U.S. Provisional Patent Application No. 62/536,919, filed on Jul. 25, 2017, the contents of which are incorporated herein by reference in its entirety.

BACKGROUND

1. Field

Some embodiments of the present disclosure relate generally to memory bandwidth management, and may also relate to a high-bandwidth memory (HBM) system including a processor and a memory controller on a HBM logic die, and to methods of processing in the HBM.

2. Description of the Related Art

FIG. 1 is a block diagram of a high-bandwidth memory HBM+ system.

Referring to FIG. 1, a conventional HBM system may generally use a single master, which is generally an off-HBM memory controller that is used to control a corresponding memory.

In a HBM+ system 100, however, a single slave (e.g., a main memory, which may be a volatile memory, such as a dynamic random access memory (DRAM) on a DRAM die) 110 may have two memory controllers 120 as masters. The two masters may be an off-HBM memory controller 120a, and an on-HBM memory controller 120b that is located on the HBM logic die 140 of the HBM 160. The HBM logic die 140 may correspond to a bottom layer of a 3D-stack memory that is the HBM 160, while the DRAM die 110 may correspond to one of the upper layers of the HBM 160. The HBM logic die 140 may control the DRAM die 110 using a "near" memory controller (NMC) 120b, which may be instructed by a processor (PU) 170 to control the DRAM die 110.

The off-HBM memory controller 120a may be referred to as a host memory controller 120a (e.g., a host memory controller 120a of a central processing unit (CPU), a graphics processing unit (GPU), or an accelerated processing unit (APU) 130). The on-HBM memory controller 120b may be referred to as a coordinating memory controller 120b, and may be located on the HBM logic die 140.

The host memory controller 120a may also be thought of as a remote memory controller, or as a "far" memory controller (FMC), because it is remotely located at a position that is farther away from the DRAM die 110 than the coordinating memory controller 120b. The coordinating memory controller 120b may be thought of as a local memory controller, or a "near" memory controller (NMC) 120b due to its proximity to the DRAM die 110. It should be noted that either or both of the host memory controller 120a and the coordinating memory controller 120b may be represented by a general memory controller.

Furthermore, the host memory controller 120a and the coordinating memory controller 120b may communicate asynchronously. Accordingly, a problem may arise when both the host memory controller 120a and the coordinating memory controller 120b attempt to concurrently access the DRAM 110.

A potential solution to conflicts arising from attempted concurrent access by both of two different memory controllers in other arts (e.g., in a system-on-a-chip (SoC) using a transaction-based protocol, such as advanced extensible interface (AXI)) may include using a bus arbiter as a central arbiter/centralized controller. The bus arbiter may decide which bus master will be allowed to control the bus for each bus cycle, and may track the status of all components. Accordingly, the two different memory controllers may ask the bus arbiter for permission to access memory, and the bus arbiter may grant permission to one of the memory controllers (i.e., granting access to only a single master at a time to enable communication between the selected master and the slave without interference from the non-selected master). Thereafter, the selected memory controller, which is granted access, may access the memory, and/or the memory can respond to the memory controller.

However, the above potential solution is not applicable to the HBM+ system 100. Unlike a transaction-based protocol, HBM does not support handshaking operations, meaning that there is no feedback signal from the HBM 160 to any memory controller 120. Further, the HBM logic die of a conventional HBM is unable to perform compute functions exclusively within the HBM logic die.

Also, unlike a transaction-based protocol, HBM does not support non-deterministic timing, meaning that once the host memory controller 120a sends a request to the HBM 160, the host memory controller 120a expects the HBM 160 to respond in a deterministic amount of time. That is, if one of the memory controllers 120 sends out a command or a request, then the HBM 160 must respond within a given amount of time (e.g., within about thirty nanoseconds) to ensure that the HBM 160 is properly providing the requested data.

The above information is only for enhancement of understanding of the background of embodiments of the present disclosure, and therefore may contain information that does not form the prior art.

SUMMARY

Some embodiments of the present disclosure provide a system and method for coordinating memory commands in a high-bandwidth memory HBM+ system.

According to some embodiments, there is provided a method of coordinating memory commands in a high-bandwidth memory HBM+ system, the method including sending a host memory controller command from a host memory controller to a memory, receiving the host memory controller command at a coordinating memory controller, forwarding the host memory controller command from the coordinating memory controller to the memory, and scheduling, by the coordinating memory controller, a coordinating memory controller command based on the host memory controller command.

Scheduling the coordinating memory controller command based on the host memory controller command may include comparing the host memory controller command with the coordinating memory controller command that is present in a coordinating memory controller command queue, and adjusting a scheduling of the coordinating memory controller command based on the comparing.

The comparing the host memory controller command with the coordinating memory controller command may include determining whether the host memory controller command and the coordinating memory controller command are scheduled for a common bank of the memory, and the method may further include refraining from sending additional memory commands from the host memory controller to the common bank when the host memory controller command and the coordinating memory controller command are scheduled for the common bank until the coordinating memory controller command is indicated as having been processed.

The method may further include establishing a configuration agreement between the host memory controller and the coordinating memory controller, the configuration agreement including a common address-mapping scheme to be followed by the host memory controller and the coordinating memory controller such that both the host memory controller and the coordinating memory controller will point to a same location inside the memory upon decoding a same address.

The method may further include sending a process-in-memory (PIM) command from the host memory controller as the host memory controller command, monitoring, by the host memory controller, a data bus between the coordinating memory controller and the host memory controller, and detecting, during the monitoring, a PIM completion acknowledgment from the coordinating memory controller indicating whether the PIM command has been processed.

The method may further include determining, with the coordinating memory controller, an estimated remaining time for processing the PIM command, indicating, with the PIM completion acknowledgment, that the PIM command has not been processed, indicating, with the PIM completion acknowledgment, the estimated remaining time, and sending the PIM completion acknowledgment from the coordinating memory controller to the host memory controller.

The determining the estimated remaining time may include scanning a coordinating memory controller command queue in the coordinating memory controller, determining pending memory commands that are pending in the coordinating memory controller command queue, determining an estimated amount of time for each of the pending memory commands, and summing the estimated amounts of time to determine the estimated remaining time.

The method may further include associating a timeout value with the PIM command, determining that the PIM command is not processed within an amount of time corresponding to the timeout value, and refraining from sending memory requests from the host memory controller.

The method may further include polling, by the host memory controller, the coordinating memory controller by sending a polling command to request the PIM completion acknowledgment indicating an estimated remaining time for processing the PIM command, wherein the polling command causes the coordinating memory controller to send the PIM completion acknowledgment sooner than the coordinating memory controller would have otherwise sent the PIM completion acknowledgment.

The method may further include setting, by the host memory controller, a priority field in the polling command indicating a priority of the PIM command, determining that the PIM command is not processed within an amount of time corresponding to a timeout value, changing, by the host memory controller, the priority field to increase priority of the PIM command, moving, by the coordinating memory controller, the PIM command up in a coordinating memory controller command queue, and processing the PIM command before other memory commands.

According to some embodiments, there is provided a high-bandwidth memory HBM+ system, the system including a coordinating memory controller, a host memory controller, a memory, a processor configured to execute instructions that, when executed by the processor, cause the processor to send a host memory controller command from a host memory controller to a memory, receive the host memory controller command at a coordinating memory controller, forward the host memory controller command from the coordinating memory controller to the memory, and schedule, by the coordinating memory controller, a coordinating memory controller command based on the host memory controller command.

The processor may be configured to schedule the coordinating memory controller command based on the host memory controller command by comparing the host memory controller command with the coordinating memory controller command that is present in a coordinating memory controller command queue, and by adjusting a scheduling of the coordinating memory controller command based on the comparing.

The processor may be configured to compare the host memory controller command with the coordinating memory controller command by determining whether the host memory controller command and the coordinating memory controller command are scheduled for a common bank of the memory, and the instructions, when executed by the processor, may further cause the processor to refrain from sending additional memory commands from the host memory controller to the common bank when the host memory controller command and the coordinating memory controller command are scheduled for the common bank until the coordinating memory controller command is indicated as having been processed.

The instructions, when executed by the processor, may further cause the processor to establish a configuration agreement between the host memory controller and the coordinating memory controller, the configuration agreement including a common address-mapping scheme to be followed by the host memory controller and the coordinating memory controller such that both the host memory controller and the coordinating memory controller will point to a same location inside the memory upon decoding a same address.

The instructions, when executed by the processor, may further cause the processor to send a process-in-memory (PIM) command from the host memory controller as the host memory controller command, monitor, by the host memory controller, a data bus between the coordinating memory controller and the host memory controller, and detect, during the monitoring, a PIM completion acknowledgment from the coordinating memory controller indicating whether the PIM command has been processed.

The instructions, when executed by the processor, may further cause the processor to determine, with the coordinating memory controller, an estimated remaining time for processing the PIM command, indicate, with the PIM completion acknowledgment, that the PIM command has not been processed, indicate, with the PIM completion acknowledgment, the estimated remaining time, and send the PIM completion acknowledgment from the coordinating memory controller to the host memory controller.

The system of claim 16, wherein the instructions, when executed by the processor, may further cause the processor to associate a timeout value with the PIM command, determine that the PIM command is not processed within an amount of time corresponding to the timeout value, and refrain from sending memory requests from the host memory controller.

The instructions, when executed by the processor, may further cause the processor to use the host memory controller to poll the coordinating memory controller by sending a polling command to request the PIM completion acknowledgment indicating an estimated remaining time for processing the PIM command, wherein the polling command causes the coordinating memory controller to send the PIM completion acknowledgment sooner than the coordinating memory controller would have otherwise sent the PIM completion acknowledgment.

The instructions, when executed by the processor, may further cause the processor to set, by the host memory controller, a priority field in the polling command indicating a priority of the PIM command, determine that the PIM command is not processed within an amount of time corresponding to a timeout value, change, by the host memory controller, the priority field to increase priority of the PIM command, move, by the coordinating memory controller, the PIM command up in a coordinating memory controller command queue, and process the PIM command before other memory commands.

According to some embodiments, there is provided an HBM+ system including an HBM including a DRAM die including a DRAM, and a logic die including a processor, and a coordinating memory controller including a comparator, a scheduler, and a command queue, and a host memory controller separate from the HBM, and configured to send a memory command to the DRAM on the DRAM die, wherein the coordinating memory controller is configured to receive the memory command, and to forward the memory command to the DRAM on the DRAM die, wherein the comparator is configured to compare another memory command from the coordinating memory controller with the memory command from the host memory controller, and wherein the scheduler is configured to schedule the memory commands in the command queue according to a comparison by the comparator.

Accordingly, the described embodiments provide techniques for coordinating two or more memory controllers for improving performance of a HBM+ system.

BRIEF DESCRIPTION OF THE DRAWINGS

Some embodiments can be understood in more detail from the following description taken in conjunction with the accompanying drawings, in which.

DETAILED DESCRIPTION

Figure 1:
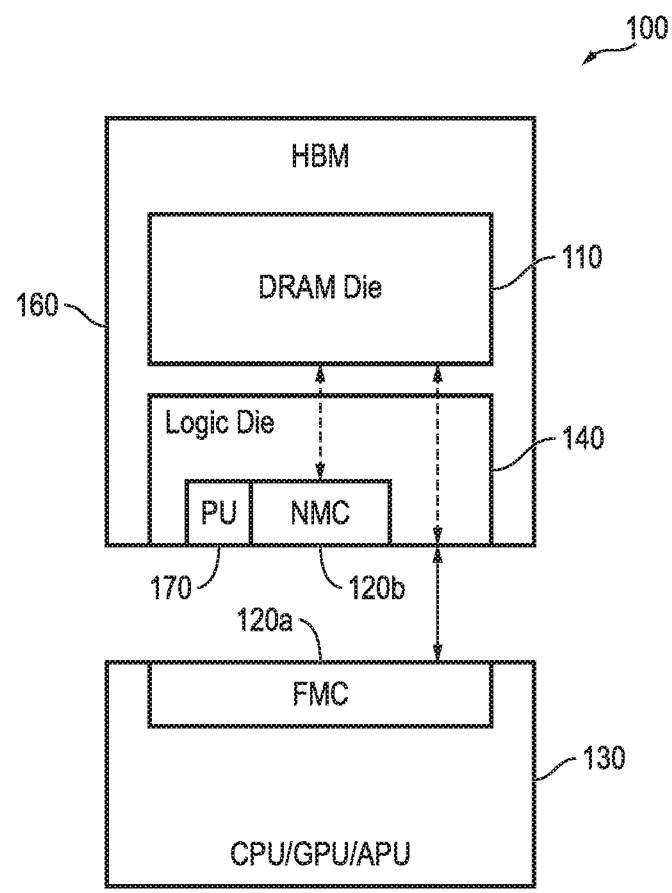
FIG. 1 is a block diagram of a high-bandwidth memory HBM+ system.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present invention refers to "one or more embodiments of the present invention." As used herein, the terms "use," "using," and "used" may be considered synonymous with the terms "utilize," "utilizing,"

and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
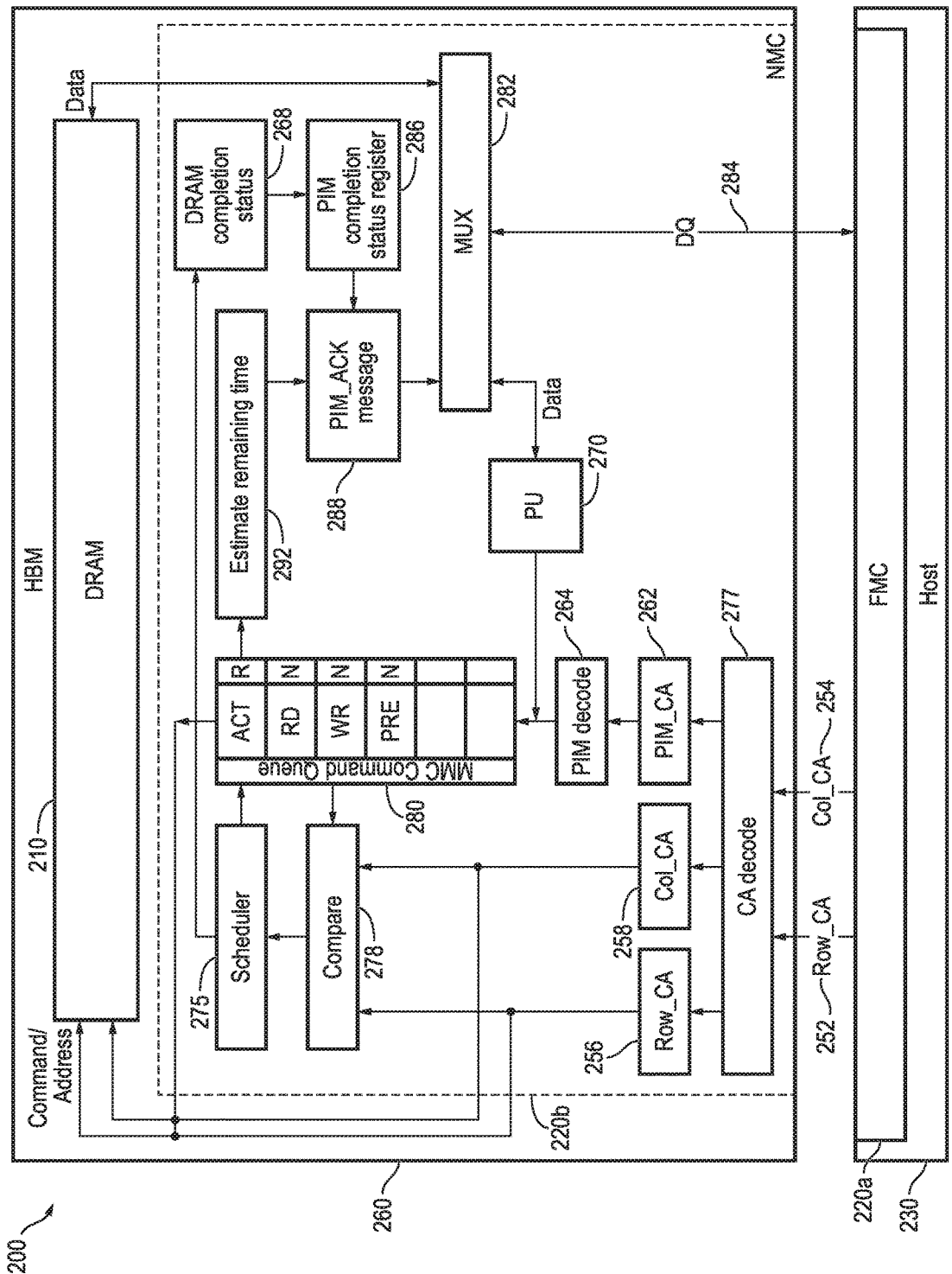
FIG. 2 is a block diagram of a detailed microarchitecture of a high-bandwidth memory HBM+ system according to an embodiment of the present disclosure.

FIG. 2 is a block diagram of a detailed microarchitecture of a high-bandwidth memory HBM+ system according to an embodiment of the present disclosure.

Referring to FIG. 2, embodiments of the present disclosure provide a system and methods for coordinating activities of a host memory controller 220a and a coordinating memory controller 220b in the context of a HBM+ system 200. Accordingly, processing-type memory activities (DRAM and processing-in-memory (PIM) activities) can be properly scheduled to guarantee functional correctness, thereby improving performance of the memory system.

In the HBM+ system 200 of the present embodiment, the coordinating memory controller 220b acts as the secondary master for the DRAM 210, and the host memory controller 220a acts as the primary master. The coordinating memory controller 220b may intercept the host memory controller commands directed to the DRAM 210, and may forward the host memory controller commands from the host memory controller 220a to the DRAM 210 in their entirety, thereby enabling the DRAM 210 to respond to the host memory controller 220a in an intended manner.

The coordinating memory controller 220b may use a scheduler 275 to schedule coordinating memory controller commands while receiving host memory controller commands from the host memory controller 220a. If the memory commands from the different memory controllers 220 are sent to different DRAM banks of the DRAM 210, then the different memory commands are independent from each other. However, when competing memory commands from the different memory controllers 220 are scheduled for the same DRAM bank of the DRAM 210, the competing memory commands may conflict, which may negatively affect system performance.

To avoid issues arising from conflicting memory commands, the coordinating memory controller 220b may use the host memory controller commands from the host memory controller 220a to adjust the scheduling decisions of the coordinating memory controller 220b. For example, the host memory controller commands may be given higher priority than coordinating memory controller commands. Accordingly, the scheduler 275 of the coordinating memory controller 220b may schedule DRAM commands sent to the DRAM 210 around, or based on, host memory controller commands according to a configuration agreement, thereby allowing for normal DRAM requests from the host memory controller 220a to cause the DRAM 210 to respond to the host memory controller 220a as expected by the host memory controller 220a. That is, a common rule of the configuration agreement that establishes a common set of rules may be followed by the coordinating memory controller 220b and the host memory controller 220a to avoid bank conflicts according to an established, agreed upon address-mapping scheme, as will be discussed further below.

The scheduler 275 of the coordinating memory controller 220b may perform the scheduling by using a comparator 278 to compare the commands from the host memory controller 220a against the command queue 280 of the coordinating memory controller 220b, and by adjusting or determining the command scheduling based on a result of the comparison. Accordingly, when there are conflicting commands from the two memory controllers 220, one of the memory controllers 220 may wait for a competing command to complete. The comparator 278 of the coordinating memory controller 220b my compare two sets of commands (e.g., one set from the coordinating memory controller 220b, and the other set from the host memory controller 220a). When the coordinating memory controller 220b determines that both sets of commands are scheduled to the same bank of the DRAM 210, then the coordinating memory controller 220b may wait until the host memory controller command is complete, and may thereafter use the scheduler 275 to schedule the command corresponding to the coordinating memory controller 220b.

Alternatively, because the host memory controller 220a may be used as the primary master, the scheduler 275 of the host memory controller 220a may be responsible for avoiding bank conflicts, as the host memory controller 220a will generally be aware of what requests are sent by the host memory controller 220a. For example, the host memory controller 220a may send a processing-in-memory (PIM) request to a first bank of the DRAM 210, and may refrain from sending other commands to the same first bank until the coordinating memory controller 220b completes processing of the PIM corresponding to the first bank, thereby ensuring functional correctness, while also reducing scheduling complexity and resource requirements for the coordinating memory controller 220b.

Accordingly, the configuration agreement between the host memory controller 220a and coordinating memory controller 220b ensures functional correctness and avoids bank conflicts while preserving the HBM interface and protocol. Additionally, normal memory requests from the host 230 may consistently progress as desired.

As discussed above, for a particular address, each of the host memory controller 220a and the coordinating memory controller 220b may use the common address-mapping scheme to correctly locate, or to point to, the actual corresponding location inside the DRAM 210. Because the DRAM 210 is organized into channels, then banks, and then rows and columns, different types of address-mapping schemes may be used to determine a location in the DRAM 210 that corresponds to a particular address. According to the configuration agreement, the host memory controller 220a and the coordinating memory controller 220b may use the same address-mapping scheme, to ensure that memory requests are not "misunderstood."

According to the address-mapping scheme, the host memory controller 220a may send out a command address for row (Row_CA) 252 and a command address for column (Col_CA) 254. Then, the coordinating memory controller 220b may determine what is indicated by the commands from the host memory controller 220a based on a command address decoder 277 of the coordinating memory controller 220b. Then, the command address decoder 277 of the coordinating memory controller 220b may determine the actual row command address 256 and/or the actual column command address 258, or may determine that the command corresponds to a PIM command address 262.

If the command does not correspond to a PIM command, a comparison is performed in a comparator 278, and the incoming Row_CA 256 and Col_CA 258 are compared against the commands within the command queue 280. Based on the comparison, the scheduler 275 of the coordinating memory controller 220b may adjust the scheduling of the commands inside the command queue 280. In the present embodiment, the commands in the command queue 280 correspond to an activation command (ACT), a read command (RD), a write command (WR), and a precharge command (PRE), which represent commands that the DRAM 210 can understand. Corresponding to each command may be a status indicator indicating "ready" (R) or "not ready" (N), which may be used by the scheduler 275 to determine when the commands can be scheduled.

Alternatively, the host memory controller 220a may attempt to send a PIM command/PIM request, as distinguished from a general DRAM access command. After the decoding operation performed by the command address decoder 277 of the coordinating memory controller 220b, if the command is a normal DRAM command, then the command will be forwarded directly to the DRAM 210. Contrastingly, if the command received by the coordinating memory controller 220b is translated into a PIM command, then the PIM command may be further decoded by a PIM decoder 264, and may processed inside the command queue 280 (e.g., from the command address decoder 277, the PIM command may be translated into a PIM command address (PIM_CA) 262, and may be sent to the PIM decoder 264 such that the PIM decoder 264 may send the decoded PIM command to the command queue 280).

Figure 3:
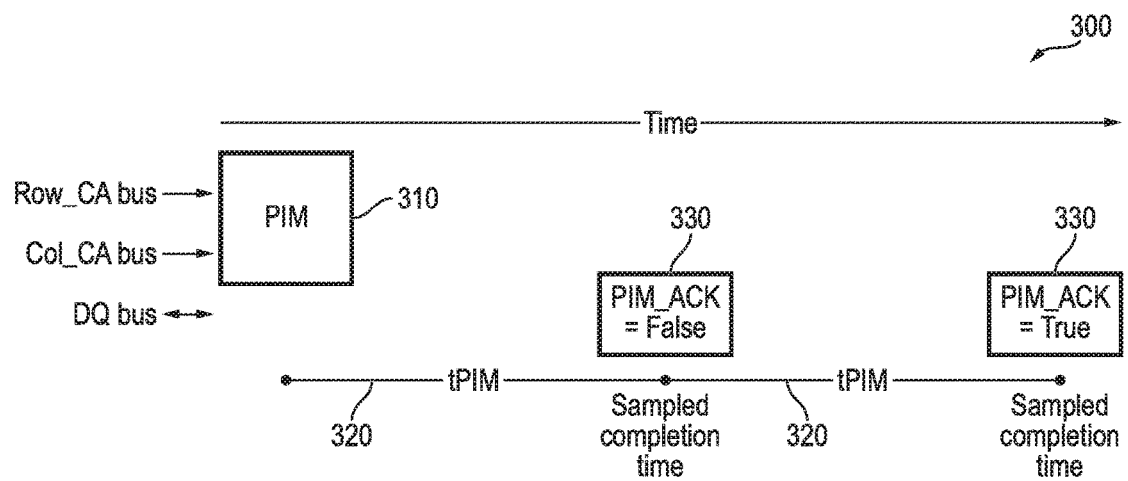
FIG. 3 is a timing diagram depicting delivery of PIM completion acknowledgments.

FIG. 3 is a timing diagram depicting delivery of PIM completion acknowledgments.

Referring to FIGS. 2 and 3, because the coordinating memory controller 220b is a secondary master, the coordinating memory controller 220b may have lower priority when trying to schedule a command. Accordingly, the coordinating memory controller 220b may take a longer amount of time to perform its operations and to complete its scheduled commands. Because processing in the coordinating memory controller 220b is non-deterministic, and because the coordinating memory controller 220b might not complete a PIM command in a deterministic time (as the PIM command may be delayed by normal memory requests from the host memory controller 220a as the primary master), the coordinating memory controller 220b may explicitly inform the host memory controller 220a of the status of any PIM request/PIM command.

Thus, after a PIM command 310 is sent from the host memory controller 220a, the host memory controller 220a may listen to, or may monitor, a data bus (DQ bus) 284 once for every PIM time interval/PIM_ACK time (tPIM) 320, which may be a time interval that corresponds to a consistent number of clock cycles of the HBM+ system 200, which may correspond to a synchronous double data rate (DDR). The host memory controller 220a may continue to monitor the DQ bus 284 to detect a PIM completion acknowledgment/PIM acknowledgement packet (PIM_ACK) 330, which may indicate whether the processing of the PIM command 310 has completed. The PIM completion acknowledgment 330 may be generated by a PIM completion acknowledgment generator 288 of the coordinating memory controller 220b.

On the DQ bus 284, the coordinating memory controller 220b may respond to a packet including information corresponding to the PIM completion acknowledgment 330. The PIM completion acknowledgment 330 may be sent by the coordinating memory controller 220b at the sampled times (e.g., once per PIM time interval 320). The PIM completion acknowledgment 330 may be instantiated as a 256-bit message, with one bit corresponding to a completion status bit, which may be set by a PIM completion status register 286 of the coordinating memory controller 220b, and which may be set when the relevant DRAM activities finish. When the completion status bit of the PIM completion acknowledgment 330 is indicated as false, then the host memory controller 220a may continue to listen to the DQ bus 284. However, if the PIM completion acknowledgment 330 indicates that the completion status bit is true, then the host memory controller 220a may be aware that the sent PIM command 310 has been completed and marked as successful.

Additionally, some or all of the remaining 255 bits of the PIM completion acknowledgment 330 may be used to provide an estimated time remaining until completion (e.g., when the completion status bit of the PIM completion acknowledgment 330 indicates that completion of the PIM command 310 has not yet occurred). For example, the coordinating memory controller 220b may include an estimator 292 to estimate the estimated time remaining until completion of the PIM command 310. Because the coordinating memory controller 220b may be aware of the status of its internal operations, the estimator 292 of the coordinating memory controller 220b can estimate how much more additional time is expected by the coordinating memory controller 220b to complete the PIM command 310 by scanning the command queue 280, determining an estimated amount of time for each of the pending commands in the command queue 280, and by summing the estimated amounts of time together. After that, the PIM completion status register 286 may be set as the relevant DRAM activities are finished, as may be indicated by a DRAM completion status indicator 268. Accordingly, the coordinating memory controller 220b can respond to the host memory controller 220a with an estimated remaining time indicated in the PIM completion acknowledgment 330.

Accordingly, the HBM interface and protocol may be preserved without wasting command bus bandwidth, although some additional DQ bus bandwidth may be used due to the placement of a packet onto the DQ bus 284 for indication of completion of the PIM command 310 for each PIM time interval 320.

Figure 4:
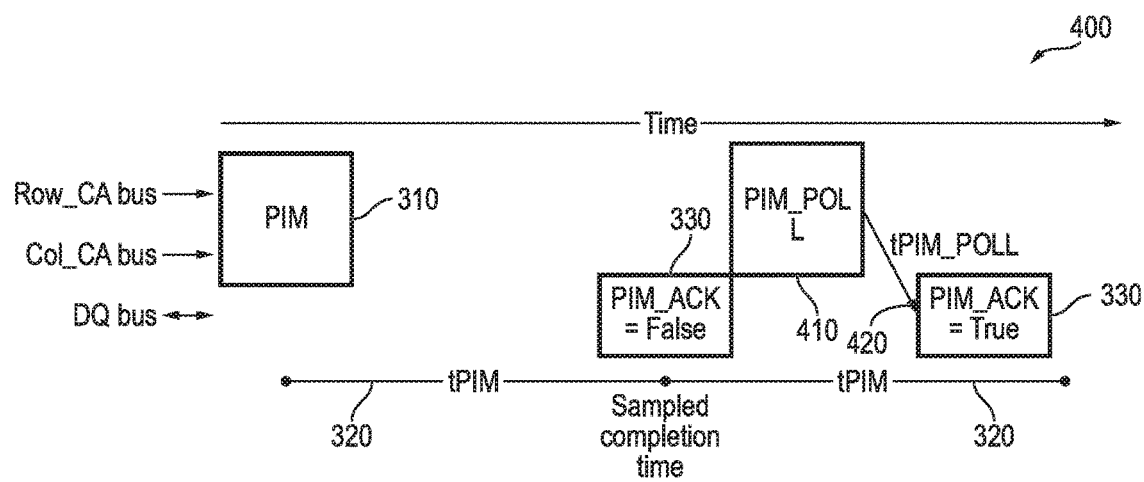
FIG. 4 is a timing diagram depicting delivery of a PIM completion acknowledgment in response to a polling command.

FIG. 4 is a timing diagram depicting delivery of a PIM completion acknowledgment in response to a polling command.

Referring to FIGS. 2 and 4, if the estimated remaining time indicated in the PIM completion acknowledgment 330 sent by the coordinating memory controller 220b is expected to be low, the host 230 may use the host memory controller 220a to actively poll the PIM completion status using a polling command (PIM_POLL) 410, thereby enabling the host memory controller 220a to have a more accurate understanding of the time remaining for processing of the PIM command 310.

After receiving the polling command 410, the coordinating memory controller 220b will return the PIM completion acknowledgment 330 (e.g., in tPIM_POLL time 420, which may be a time interval occurring more frequently than the PIM time interval 320). Accordingly, the host memory controller 220 may receive information regarding the expected completion of the PIM command 310 at a rate occurring more quickly than expected with the unsolicited PIM completion acknowledgments 330 sent by the coordinating memory controller 220b, which occur only once per PIM time interval 320, as discussed above. For example, based on current specifications for an HBM system, the PIM time interval 320 may be estimated to be more than about fifty nanoseconds, while tPIM_POLL time 420 may be estimated to be about three nanoseconds. Because the sample completion time is about fifty nanoseconds, and because the estimated remaining time may occasionally be very short, it may not be suitable to wait an additional fifty nanoseconds to receive the actual acknowledgement status. Accordingly, the polling command 410 may improve efficiency and performance of the HBM+ system 200.

The benefit provided by active polling is that the sample completion time is served, while also enabling the host memory controller 220a to receive the acknowledgement status more quickly. However, because a new command may be used to implement the active polling, extra command bus bandwidth may be used to implement the new command.

With respect to the PIM completion acknowledgments 330 and the polling commands 410 discussed above, the data path from the DRAM 210 may be controlled by a MUX 282. The MUX 282 may send data from the DRAM 210 back to the host memory controller 220a, or may send the data back to the processor 270 inside the coordinating memory controller 220b. When the data is to be used for internal operation of the coordinating memory controller 220b, the data may be directed to the processor 270. However, when the data is a response to the host memory controller 220a, then the data may be directed to the host memory controller 220a. The DQ bus 284 may be used to transfer either normal data or the PIM completion acknowledgment 330.

Although HBM interface and protocol may preserved, and although normal memory app requests from the host may be ensured to progress as desired, because the coordinating memory controller 220b has lower priority, the corresponding commands may complete slower than suitable. Further, additional cycles for decoding the commands from the host memory controller 220a may be used.

According to the present embodiment, priority of a given PIM command 310 may be set to allow the PIM command 310 to complete within the desired time. Such priority information for setting the priority may be embedded in the PIM command 310 and/or in the polling command 410.

For example, to avoid a situation in which the coordinating memory controller 220b perpetually fails complete processing of the PIM command 310, the host memory controller 220a may make suitable scheduling decisions and/or send priority info to the coordinating memory controller 220b. Because the coordinating memory controller 220b, as the secondary master, may typically schedule around host memory controller commands, a situation in which the host memory controller 220a continuously sends commands may prevent the coordinating memory controller 220b from being able to schedule operations for the PIM commands of the coordinating memory controller 220b. Thus, each PIM command 310 may be associated with a timeout value. If, the PIM completion acknowledgment 330 received by the host memory controller 220a is still false after the timeout value is reached (e.g., after a sufficient amount of time has passed), then the host memory controller 220a may cease sending normal memory requests to the HBM channel to thereby provide an opportunity for the coordinating memory controller 220b to schedule the PIM command 310 out of order, thereby enabling completion of the PIM command 310.

Further, the coordinating memory controller 220b may schedule PIM commands 310 out of order for improved performance, which may result in the execution of some of the PIM commands 310, which were requested earlier, occurring after later-requested ones of the PIM commands 310. A priority field may be set by the host memory controller 220a in the PIM command 310 such that the coordinating memory controller 220b may execute PIM commands having relatively higher priority. That is, the host memory controller 220a can set the priority field so that the coordinating memory controller 220b, upon decoding the priority field, will know if the coordinating memory controller 220b should execute this PIM command 310 immediately.

Furthermore, there may be a field for priority in the polling command 410. Accordingly, the host memory controller 220a may change the priority of a previously issued PIM command 310. For example, if the host memory controller 220a sees that a PIM command 310 is taking an unacceptably long amount of time to complete, the host memory controller 220a can escalate the priority of the PIM command 310 by using the priority field to cause the PIM command 310 to be completed more quickly, as the coordinating memory controller 220b may start executing PIM commands with a higher priority.

Accordingly, the above described embodiments of the present disclosure provide a high-bandwidth memory HBM+ system.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A method of coordinating memory commands in a high-bandwidth memory HBM+ system, the method comprising:
    sending a host memory controller command from a host memory controller to a memory;
    receiving the host memory controller command at a coordinating memory controller;
    forwarding the host memory controller command from the coordinating memory controller to the memory;
    scheduling, by the coordinating memory controller, a coordinating memory controller command based on the host memory controller command;
    determining whether the host memory controller command and the coordinating memory controller command are scheduled for a common bank of the memory; and
    refraining from sending additional memory commands from the host memory controller to the common bank based on the host memory controller command and the coordinating memory controller command being scheduled for the common bank.

2. The method of claim 1, wherein scheduling the coordinating memory controller command based on the host memory controller command comprises:
    comparing the host memory controller command with the coordinating memory controller command that is present in a coordinating memory controller command queue; and
    adjusting a scheduling of the coordinating memory controller command based on the comparing.

3. The method of claim 2, further comprising sending additional memory commands from the host memory controller to the common bank when the host memory controller command and the coordinating memory controller command are scheduled for the common bank after the coordinating memory controller command is indicated as having been processed.

4. The method of claim 1, the method further comprising establishing a configuration agreement between the host memory controller and the coordinating memory controller, the configuration agreement comprising a common address-mapping scheme to be followed by the host memory controller and the coordinating memory controller such that both the host memory controller and the coordinating memory controller will point to a same location inside the memory upon decoding a same address.

5. The method of claim 1, the method further comprising:
    sending a process-in-memory (PIM) command from the host memory controller as the host memory controller command;
    monitoring, by the host memory controller, a data bus between the coordinating memory controller and the host memory controller; and
    detecting, during the monitoring, a PIM completion acknowledgment from the coordinating memory controller indicating whether the PIM command has been processed.

6. The method of claim 5, the method further comprising:
    determining, with the coordinating memory controller, an estimated remaining time for processing the PIM command;
    indicating, with the PIM completion acknowledgment, that the PIM command has not been processed;
    indicating, with the PIM completion acknowledgment, the estimated remaining time; and
    sending the PIM completion acknowledgment from the coordinating memory controller to the host memory controller.

7. The method of claim 6, wherein the determining the estimated remaining time comprises:
    scanning a coordinating memory controller command queue in the coordinating memory controller;
    determining pending memory commands that are pending in the coordinating memory controller command queue;
    determining an estimated amount of time for each of the pending memory commands; and
    summing the estimated amounts of time to determine the estimated remaining time.

8. The method of claim 6, further comprising:
    associating a timeout value with the PIM command;
    determining that the PIM command is not processed within an amount of time corresponding to the timeout value; and
    refraining from sending memory requests from the host memory controller.

9. The method of claim 5, the method further comprising polling, by the host memory controller, the coordinating memory controller by sending a polling command to request the PIM completion acknowledgment indicating an estimated remaining time for processing the PIM command, wherein the polling command causes the coordinating memory controller to send the PIM completion acknowledgment sooner than the coordinating memory controller would have otherwise sent the PIM completion acknowledgment.

10. The method of claim 9, further comprising:
setting, by the host memory controller, a priority field in the polling command indicating a priority of the PIM command;
determining that the PIM command is not processed within an amount of time corresponding to a timeout value;
changing, by the host memory controller, the priority field to increase priority of the PIM command;
moving, by the coordinating memory controller, the PIM command up in a coordinating memory controller command queue; and
processing the PIM command before other memory commands.

11. A high-bandwidth memory HBM+ system, the system comprising:
a coordinating memory controller;
a host memory controller;
a memory;
a processor configured to execute instructions that, when executed by the processor, cause the processor to:
send a host memory controller command from a host memory controller to a memory;
receive the host memory controller command at a coordinating memory controller;
forward the host memory controller command from the coordinating memory controller to the memory;
schedule, by the coordinating memory controller, a coordinating memory controller command based on the host memory controller command; and
establish a configuration agreement between the host memory controller and the coordinating memory controller, the configuration agreement comprising a common address-mapping scheme to be followed by the host memory controller and the coordinating memory controller.

12. The system of claim 11, wherein the processor is configured to schedule the coordinating memory controller command based on the host memory controller command by comparing the host memory controller command with the coordinating memory controller command that is present in a coordinating memory controller command queue, and by adjusting a scheduling of the coordinating memory controller command based on the comparing.

13. The system of claim 12, wherein the processor is configured to compare the host memory controller command with the coordinating memory controller command by determining whether the host memory controller command and the coordinating memory controller command are scheduled for a common bank of the memory,
and wherein the instructions, when executed by the processor, further cause the processor to refrain from sending additional memory commands from the host memory controller to the common bank when the host memory controller command and the coordinating memory controller command are scheduled for the common bank until the coordinating memory controller command is indicated as having been processed.

14. The system of claim 11, wherein the common address-mapping scheme causes both the host memory controller and the coordinating memory controller to point to a same location inside the memory upon decoding a same address.

15. The system of claim 11, wherein the instructions, when executed by the processor, further cause the processor to:
send a process-in-memory (PIM) command from the host memory controller as the host memory controller command;
monitor, by the host memory controller, a data bus between the coordinating memory controller and the host memory controller; and
detect, during the monitoring, a PIM completion acknowledgment from the coordinating memory controller indicating whether the PIM command has been processed.

16. The system of claim 15, wherein the instructions, when executed by the processor, further cause the processor to:
determine, with the coordinating memory controller, an estimated remaining time for processing the PIM command;
indicate, with the PIM completion acknowledgment, that the PIM command has not been processed;
indicate, with the PIM completion acknowledgment, the estimated remaining time; and
send the PIM completion acknowledgment from the coordinating memory controller to the host memory controller.

17. The system of claim 16, wherein the instructions, when executed by the processor, further cause the processor to:
associate a timeout value with the PIM command;
determine that the PIM command is not processed within an amount of time corresponding to the timeout value; and
refrain from sending memory requests from the host memory controller.

18. The system of claim 15, wherein the instructions, when executed by the processor, further cause the processor to use the host memory controller to poll the coordinating memory controller by sending a polling command to request the PIM completion acknowledgment indicating an estimated remaining time for processing the PIM command, wherein the polling command causes the coordinating memory controller to send the PIM completion acknowledgment sooner than the coordinating memory controller would have otherwise sent the PIM completion acknowledgment.

19. The system of claim 18, wherein the instructions, when executed by the processor, further cause the processor to:
set, by the host memory controller, a priority field in the polling command indicating a priority of the PIM command;
determine that the PIM command is not processed within an amount of time corresponding to a timeout value;
change, by the host memory controller, the priority field to increase priority of the PIM command;
move, by the coordinating memory controller, the PIM command up in a coordinating memory controller command queue; and
process the PIM command before other memory commands.

20. An HBM+ system comprising:
an HBM comprising:
a DRAM die comprising a DRAM; and
a logic die comprising a processor, and a coordinating memory controller comprising a comparator, a scheduler, and a command queue; and
a host memory controller separate from the HBM, and configured to send a memory command to the DRAM on the DRAM die, wherein the coordinating memory controller is configured to receive the memory command, and to forward the memory command to the DRAM on the DRAM die, wherein the comparator is configured to compare another memory command from the coordinating memory controller with the memory command from the host memory controller, and wherein the scheduler is configured to schedule the memory command from the coordinating memory controller and the memory command from the host memory controller in the command queue according to a comparison by the comparator.

\* \* \* \* \*